United States Patent
Kasperchik et al.

(10) Patent No.: US 10,570,300 B2
(45) Date of Patent: Feb. 25, 2020

(54) WHITE INKS

(71) Applicant: Hewlett-Packard Development Company, L.P., Fort Collins, CO (US)

(72) Inventors: Vladek Kasperchik, Corvallis, OR (US); Paul Joseph Bruinsma, San Diego, CA (US); Thomas W. Butler, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 82 days.

(21) Appl. No.: 15/544,711

(22) PCT Filed: May 29, 2015

(86) PCT No.: PCT/US2015/033184
§ 371 (c)(1),
(2) Date: Jul. 19, 2017

(87) PCT Pub. No.: WO2016/175871
PCT Pub. Date: Nov. 3, 2016

(65) Prior Publication Data
US 2017/0355867 A1    Dec. 14, 2017

(30) Foreign Application Priority Data

Apr. 27, 2015 (WO) ................ PCT/US2015/027743
Apr. 27, 2015 (WO) ................ PCT/US2015/027793

(51) Int. Cl.
*C09D 11/322* (2014.01)
*C09D 11/54* (2014.01)
(Continued)

(52) U.S. Cl.
CPC .......... *C09D 11/322* (2013.01); *C09D 11/033* (2013.01); *C09D 11/106* (2013.01);
(Continued)

(58) Field of Classification Search
None
See application file for complete search history.

(56) References Cited

U.S. PATENT DOCUMENTS 5,972,087 A     10/1999   Uraki et al.
7,026,368 B2    4/2006    Yamada et al.
(Continued)

FOREIGN PATENT DOCUMENTS

EP     1258510    11/2002
EP     1388578    2/2004
(Continued)

OTHER PUBLICATIONS https://web.archive.org/web/20150622040405/https://www.sigmaaldrich.com/catalog/product/sigma/s5505?lang=en&region=US, Jun. 2015.*
(Continued)

*Primary Examiner* — Satya B Sastri
(74) *Attorney, Agent, or Firm* — Thorpe North & Western LLP (57) ABSTRACT

The present disclosure provides a white ink including an aqueous ink vehicle; from 5 wt % to 50 wt % of a white metal oxide pigment having an average particulate size from 75 nm to 2,000 nm and a refractive index of 1.8 to 2.8; and from 0.1 wt % to 15 wt % of fumed oxide particulates having a tertiary agglomerated average particulate size from 20 nm to 750 nm and a refractive index of 1.1 to 1.6. The white ink further includes a polymeric dispersant associated with a surface of the white metal oxide pigment.

20 Claims, 3 Drawing Sheets

(51) Int. Cl.
*C09D 11/033* (2014.01)
*C09D 11/107* (2014.01)
*C09D 11/326* (2014.01)
*C09D 11/38* (2014.01)
*C09D 11/106* (2014.01)
*B41M 5/00* (2006.01)

(52) U.S. Cl.
CPC .......... *C09D 11/107* (2013.01); *C09D 11/326* (2013.01); *C09D 11/38* (2013.01); *C09D 11/54* (2013.01); *B41M 5/0017* (2013.01); *B41M 5/0047* (2013.01); *B41M 5/0064* (2013.01)

(56) References Cited

U.S. PATENT DOCUMENTS

| | | | |
|---|---|---|---|
| 7,622,513 | B2 | 11/2009 | Sarkisian et al. |
| 7,635,504 | B2 | 12/2009 | Elwakil et al. |
| 7,850,774 | B2 | 12/2010 | Oriakhi |
| 8,198,391 | B2 | 6/2012 | Itoya et al. |
| 8,318,120 | B2 | 11/2012 | Nelson et al. |
| 8,404,761 | B2 | 3/2013 | Shinozaki et al. |
| 8,449,097 | B2 | 5/2013 | Nishimura et al. |
| 8,466,213 | B2 * | 6/2013 | Ueno ................ D06P 5/30 427/288 |
| 8,512,827 | B2 | 8/2013 | Seguchi et al. |
| 8,617,302 | B2 | 12/2013 | Okuda et al. |
| 8,771,556 | B2 | 7/2014 | Kim et al. |
| 8,783,842 | B2 | 7/2014 | Ingle et al. |
| 8,784,508 | B2 | 7/2014 | Ellis |
| 8,784,550 | B2 | 7/2014 | Kasperchik et al. |
| 9,023,472 | B2 * | 5/2015 | Egami ................ C09C 1/0084 428/32.1 |
| 2004/0063808 | A1 | 4/2004 | Ma et al. |
| 2005/0231573 | A1 | 10/2005 | Bruinsma et al. |
| 2006/0155005 | A1 | 7/2006 | Kondo et al. |
| 2007/0200794 | A1 | 8/2007 | Mueller et al. |
| 2008/0138530 | A1 | 6/2008 | Lin et al. |
| 2008/0188596 | A1 * | 8/2008 | Akers ................ C09D 11/30 524/104 |
| 2010/0047456 | A1 | 2/2010 | Kariya |
| 2010/0190922 | A1 | 7/2010 | Shinozaki et al. |
| 2010/0222492 | A1 | 9/2010 | Sarkisian et al. |
| 2010/0231671 | A1 | 9/2010 | Anton et al. |
| 2013/0027451 | A1 | 1/2013 | Li |
| 2013/0092049 | A1 | 4/2013 | Lee et al. |
| 2013/0155160 | A1 | 6/2013 | Shiono |
| 2013/0202858 | A1 | 8/2013 | Shimohara |
| 2013/0224451 | A1 * | 8/2013 | Shiono ................ C09D 11/38 428/207 |
| 2014/0118449 | A1 | 5/2014 | Sarkisian et al. |
| 2014/0123874 | A1 | 5/2014 | Kabalnov et al. |
| 2014/0170395 | A1 | 6/2014 | Kasperchik et al. |
| 2014/0352573 | A1 | 12/2014 | Kasperchik et al. |
| 2014/0354740 | A1 | 12/2014 | Smet et al. |

FOREIGN PATENT DOCUMENTS

| | | |
|---|---|---|
| EP | 2206753 | 7/2010 |
| EP | 2599841 | 6/2013 |
| JP | 2002038063 | 2/2002 |
| JP | 2014214221 | 11/2014 |
| WO | 2006049012 | 5/2006 |
| WO | 2007035505 | 3/2007 |
| WO | 2009053302 | 4/2009 |
| WO | 2012009415 | 1/2012 |
| WO | 2012054052 | 4/2012 |
| WO | 2012170032 | 12/2012 |
| WO | 2013162513 | 10/2013 |
| WO | 2014042652 | 3/2014 |
| WO | 2014066608 | 5/2014 |
| WO | 2014135843 | 9/2014 |
| WO | 2014193387 | 12/2014 |

OTHER PUBLICATIONS

International Search Report and Written Opinion dated Oct. 28, 2015 for PCT/US2015/033184; Applicant Hewlett-Packard Development Company L.P.

* cited by examiner

WHITE INKS

BACKGROUND

The use of ink-jet printing systems has grown dramatically in recent years. This growth may be attributed to substantial improvements in print resolution and overall print quality coupled with appreciable reduction in cost. Today's ink-jet printers offer acceptable print quality for many commercial, business, and household applications at lower costs than comparable products available just a few years ago. Notwithstanding their recent success, research and development efforts continue toward improving ink-jet print quality over a wide variety of different applications, but there remain challenges. In one instance, certain pigments can be more challenging than other in achieving certain desirable properties. For example, ink opacity can be more difficult to achieve for white inks compared to black, magenta, or cyan inks.

BRIEF DESCRIPTION OF THE DRAWINGS

Additional features and advantages of the disclosure will be apparent from the detailed description which follows, taken in conjunction with the accompanying drawings, which together illustrate, by way of example, features of the present technology.

Reference will now be made to the exemplary embodiments illustrated, and specific language will be used herein to describe the same. It will nevertheless be understood that no limitation of the scope of the disclosure is thereby intended.

DETAILED DESCRIPTION

The present disclosure is drawn to white inks, including water-based white inkjet inks that can be jetted from various types of inkjet printheads, but which can also be particularly friendly for use in thermal inkjet printheads. These inks, in some instances with the assistance of a fixer coating layer or fixer ink, can be printed not only on porous media, but also effectively on more challenging non-porous polymer media.

Formulating water-based white inks with an adequate print opacity performance can be difficult task due in part to evaporation of water-based ink vehicles during drying and/or curing. Essentially, as the vehicle dries after printing, white pigment particles can be pushed together, e.g., pigment crowding effect occurs. The result can be a dramatically reduced opacity of the dried white coating or image. Essentially, it may be counterintuitive, but as white pigment particles move closer together, rather than providing a stronger white appearance with higher opacity, the printed image or coating starts to act more like a unitary structure, and will not scatter light as well as when the white pigment particles are more appropriately spaced apart. Thus, in certain examples described herein, by decreasing the density of the white metal oxide pigment content by replacing or adding to the white metal oxide pigment using fumed oxide particulates with lower densities for spacing, opacity can actually be increased.

Thus, in accordance with examples of the present disclosure, a white ink can include an aqueous ink vehicle, and from 5 wt % to 50 wt % of a white metal oxide pigment having an average particulate size from 75 nm to 2,000 nm and a refractive index ranging from 1.8 to 3.0. The white ink can further include from 0.1 wt % to 15 wt % of fumed oxide particulates having a tertiary agglomerated average particulate size from 20 nm to 750 nm and a refractive index of 1.1 to 1.6, and a polymeric dispersant associated with a surface of the white metal oxide pigment.

In another example, a method of making a white ink can include the step of milling a white metal oxide pigment dispersed in a water-based carrier with polymeric dispersant including a short-chain anionic dispersing agent, or a non-ionic or predominantly non-ionic dispersing agent, or combination of both, to form a white metal oxide pigment dispersion. The method can further include admixing water, organic co-solvent, and fumed oxide particulates with the white metal oxide pigment dispersion to form a white ink having a white metal oxide pigment to fumed oxide particulate weight ratio from 2:1 to 50:1.

In another example, a fluid set for inkjet imaging can include a white ink and a fixer fluid. The white ink can include an aqueous ink vehicle, from 0.1 wt % to 15 wt % of fumed oxide particulates having a tertiary agglomerated average particle size from 20 to 750 nm, and from 5 wt % to 50 wt % of a white metal oxide pigment having an average particulate size from 75 nm to 2,000 nm. The white metal oxide pigment can be dispersed in a water-based carrier with a polymeric dispersant including a short-chain anionic dispersing agent, or a non-ionic or predominantly non-ionic dispersing agent, or combination of both. The fixer fluid can include an aqueous fixer vehicle and from 0.1 wt % to 25 wt % cationic polymer.

These white inks can be used in forming white images on various media substrate, including smooth polymer (non-porous) media substrate, and can be printed in combination, as mentioned, with a fixer coated on the surface of the media. For example, a fixer with cationic polymer can be applied to the media substrate and can be formulated so that its cationic polymer interacts with any anionically charged components in the white ink to immobilize the white metal oxide pigment.

In each of these examples, there are several advantages related to the inclusion of the fumed oxide particulates along with a more dominant concentration of the white metal oxide pigment. The addition of fumed oxide particulates provides spacing as briefly described to enhance the opacity of the printed and dried/cured printed image, as will be described in greater detail hereinafter. Additionally, if the fumed oxide particulates have a relatively strong to very strong negative charge, an electrostatic interaction with cationic polymer that may be present on the media substrate, or as part of a fixer fluid to be printed (digitally) or otherwise applied (analog application) on a media substrate, can provide fixation properties to the printed image.

Figure 1:
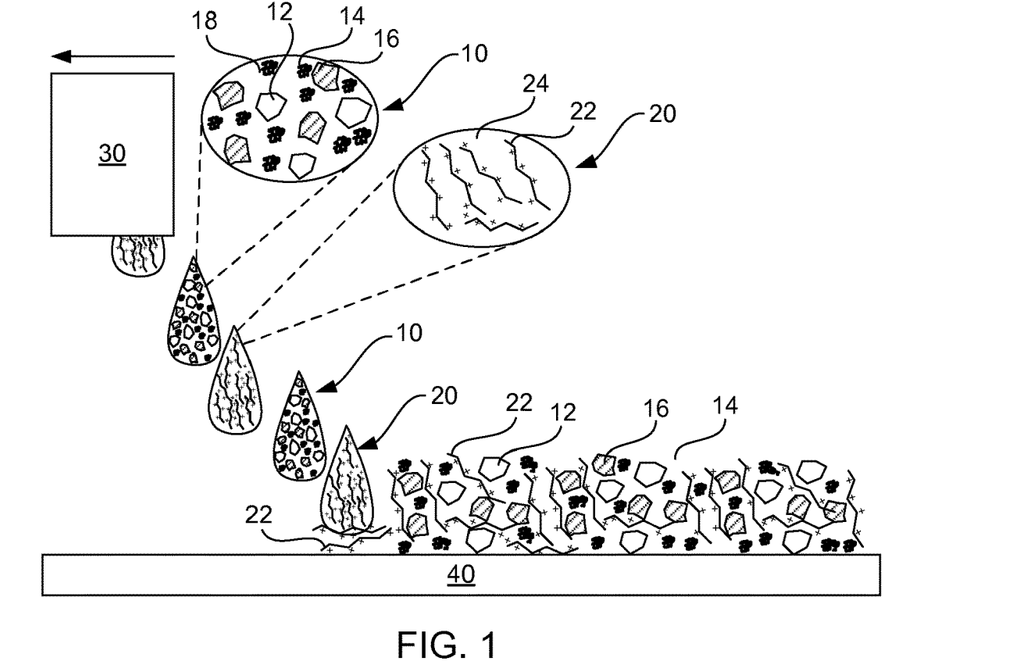
FIG. 1 depicts examples where a cationic polymer formulation is digitally printed on a media substrate contemporaneously or just before printing a white inkjet ink thereon, and wherein the white inkjet ink is prepared in accordance with examples of the present disclosure.
Figure 2:
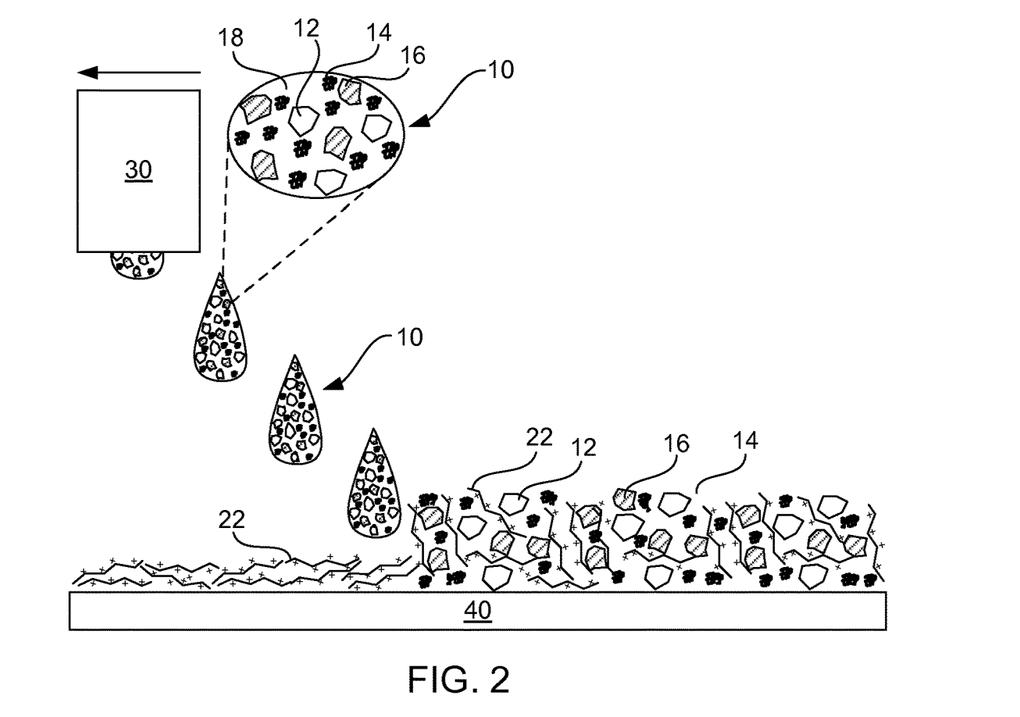
FIG. 2 depicts examples where a cationic polymer is applied to a media substrate prior to (either digital or by analog application) printing a white inkjet ink thereon, and wherein the white inkjet ink is prepared in accordance with examples of the present disclosure.

FIG. 1 depicts an example where a digitally printed fixer is applied just prior to or essentially simultaneously with an inkjet ink of the present disclosure. FIG. 2 depicts an example where a fixer is applied to a media substrate prior to application of an inkjet ink. The fixer in this latter example can likewise be applied by digital printing, or alternatively, by analog application, e.g., roller, curtain coating, blade coating, Meyer rod coating, or any other coating methodology suitable for producing thin layer of fixer on the printed substrate, etc. As shown in FIGS. 1 and 2, an inkjet printing device 30 is adapted to digitally print a white inkjet ink 10, and in some examples, a fixer composition 20 on a media substrate 40. The media substrate can be a smooth, non-porous polymer substrate that is otherwise difficult to print on with high image quality and high durability. Specifically, FIG. 1 shows the fixer composition being printed digitally from the printing device, and FIG. 2 shows the fixer composition being pre-applied to the media substrate, either digitally or by an analog coating method. In both examples, the white inkjet ink includes white metal oxide pigment 12, fumed oxide particulates 14, latex particulates 16, and an ink vehicle 18 which typically includes a non-ionic dispersant or dispersing agent. Water, organic solvent, and/or other ingredients can likewise be present in the ink vehicle. The fixer composition can include cationic polymer 22 that is interactive with the white pigment, the fumed oxide particles, or other anionic components that may be found in the white ink, thereby providing some immobilization or freezing of the pigment and particles on the print media substrate.

Figure 3:
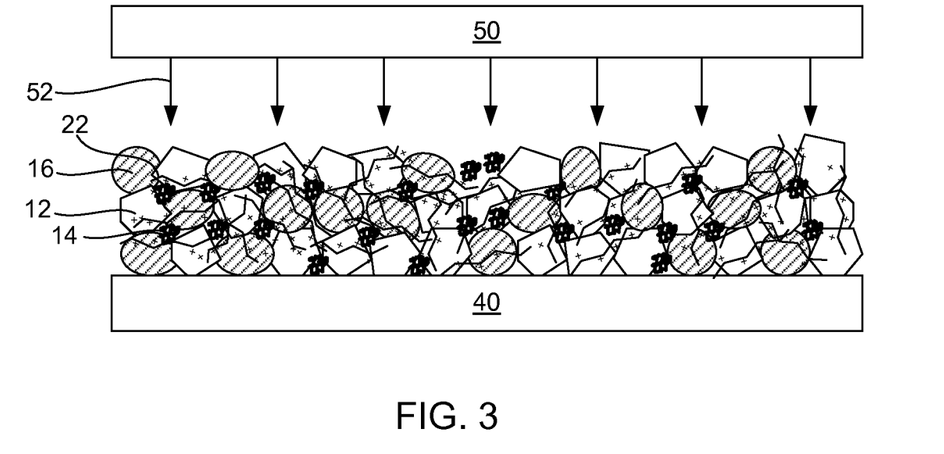
FIG. 3 depicts examples of heat drying and fusing an image printed in as described in FIG. 1 or 2 in accordance with examples of the present disclosure.
Figure 4:
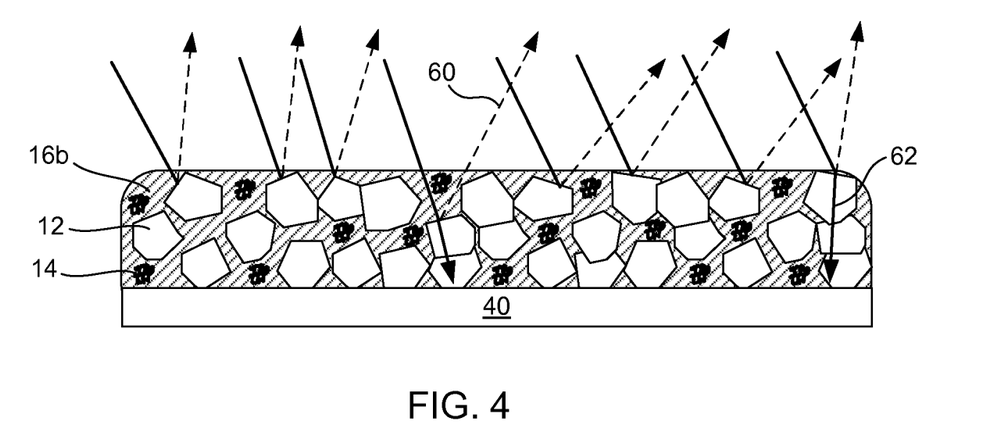
FIG. 4 depicts a printed article, such as that shown in FIG. 3, after heat fusing on the media substrate in accordance with examples of the present disclosure.

In another example, the image printed or otherwise generated in accordance with FIGS. 1 and 2 can be heat fused. More specifically, FIG. 3 shows a heat fusing device 50 which is used to apply heat 52 to the printed article to form a heat fused printed article as shown in FIG. 4. Because of the presence of both the fumed oxide 14 and the latex particulates 16,16b providing spacing between white metal oxide pigment particles 12, there can be enhanced light scattering 60 and lower transmittance 62 than even more densely packed white metal oxide pigment, which thus provides enhanced opacity. This increased opacity can be achieved by optically spacing the white metal oxide pigment from one another. For example, drying of the inks without fumed oxide particulates such that all of the high refractive index particulates are in close contact leads to formation of a densely packed layer of the white metal oxide pigment, which reduces their light scattering ability and overall opacity. On the other hand, using the fumed oxide particulates (and the latex particulates) as shown, and typically applying heat to fuse the latex particulates, the low refractive index optical spacing can boost the opacity of the printed coating by from 0.1% to 25%, or more typically from 5% to 20% or from 5% to 25%. In other words, the crowding effect of tightly-packed high refractive index (n) particulates with little or no voids decreases light scattering and increase transparency of the coating. By optically spacing the white metal oxide pigment with the low refractive index fumed oxide particulates (and typically heat fusing the latex after printing) an increase in opacity can be realized. As a further point, fusion can add enhanced durability to the printed article. In some cases, the fusing of the latex particulates may help the latex polymer distribute more evenly between light scattering white metal oxide pigment particles and, hence, further improve opacity as well. That, in combination with the presence of the fumed oxide particulates, provides improved results.

In accordance with this, a printed article can include up to 80, or up to 50 gsm, of a total fluids (white ink+fixer) applied to a media substrate. The term "up to 80 gsm" is used because typical inkjet images include fully imaged areas as well as non-imaged and/or lower density areas. After water and solvent(s) evaporation and fusing, the gsm roughly translates into 15-50 wt % of the initial fluid dispersion flux density, i.e. thus less than 60 gsm. In one example, full density inked area may be at from 30 to 60 gsm ink/fixer film, but densities lower in the tone ramp will be lower than this, thus the use of the phrase "up to" 75 gsm or "up to" 60 gsm. That being stated, though some areas on a media substrate might be at 0 gsm under this definition (unprinted areas), there will be areas that are imaged that range from greater than 0 gsm up to 60 gsm (after drying or heat fusing). In a typical printed article, there is a portion of the media that can be printed at from 5 gsm to 60 gsm.

Turning now to the various specific ingredients that are present in the white ink, there can be a white metal oxide pigment. The "white" pigment provides much of the white coloration to the ink, though without the other ingredients in the ink, individual pigment particles may have some transparency or translucency. Examples of white metal oxide pigments that can be used include titanium dioxide particulates, zinc oxide particulates, zirconium oxide particulates, combinations thereof, or the like. Pigments with high light scatter capabilities, such as these, can be selected to enhance light scattering and lower transmittance, thus increasing opacity. White metal oxide pigments can have a particulate size from about 75 nm to 2,000 nm, or from 100 nm to about 1,000 nm, or more typically, from about 125 nm to 700 nm, and in still another example, from about 150 nm to 500 nm. The combination of these pigments within these size ranges, appropriately spaced from one another with ingredients such as the fumed oxide particulates, high opacity can be achieved at relatively thin thickness, e.g., 5 gsm to 50 gsm after removal of water and other solvent(s) from the printed ink and fixer film.

The white metal oxide pigment, among other solids that may be present, can be dispersed using a short-chain anionic dispersant, and/or a non-ionic or predominantly non-ionic dispersing agent, and/or any other dispersant effective for dispersing the white metal oxide pigment. Suitable dispersing agents can allow for dispersibility and stability in an aqueous ink environment, while having little to no impact on the viscosity of the liquid phase of the ink, as well as retain good printhead reliability in thermal inkjet printheads (if the ink is a thermal inkjet ink). If the ink is a piezo inkjet ink, then additional flexibility regarding viscosity is tolerable. Dispersant of one or various types can each be present in the inks of the present disclosure at various concentrations, such as from 0.005 wt % to 5 wt %.

For definitional purposes, "short-chain anionic dispersants" that can be used include polymeric dispersants with chain length short enough to impact viscosity of ink formulation at moderate concentrations, typically having an acid number higher than 100 mg KOH/g based in dry polymer content. For example, short-chain anionic dispersants can include dispersants having a weight average molecular weight lower than 30,000 Mw, or more typically, lower than 15,000 Mw, e.g., 1,000 Mw to 30,000 Mw, or from 2,000 Mw to 15,000 Mw.

Also for definitional purposes, "non-ionic or predominantly non-ionic dispersants" include non-ionic dispersants, as well as only weakly ionic dispersants, i.e. the acid number of the non-ionic or predominantly non-ionic/weak anionic dispersant, per dry polymer, is typically not higher than 100 mg KOH/g, and is typically not higher than 50 mg KOH/g, or even not higher than 30 mg KOH/g. That being state, in one example, non-ionic dispersing agent with no anionic properties can be used. These non-ionic or predominantly non-ionic dispersants can range in average molecular weight from 500 Mw to 50,000 Mw, in certain examples.

Turning now to the short-chain anionic dispersants, examples include polymers and/or oligomers with low weight average molecular weight. More specifically, low molecular weight (Mw) short-chain anionic dispersants can include acrylic and methacrylic acids homopolymers such as polyacrylic acid (PAA), polymethacrylic acid (PMAA), or their salts. More specific examples include, but are not limited to, Carbosperse® K-7028 (PAA with M-2,300), Carbosperse® K-752 (PAA with M-2,000), Carbosperse® K-7058 (PAA with M-7,300), Carbosperse® K-732 (PAA with M-6,000), Carbosperse® K-752 (Na salt of PMAA with M-5,000), all available from Lubrizol Corporation. Others include Dispex® AA 4935 available from BASF Dispersions & Pigments Division, as well as Tamol® 945 available from Dow Chemical. Low molecular weight acrylic and methacrylic acid co-polymers with other carboxylic monomer moieties can also be used, such as co-polymers of acrylic and maleic acids available from Kelien Water Purification Technology Co. Low molecular weight co-polymers of carboxylic acid monomers with other water-soluble non-carboxylic acidic monomer moieties, such as sulfonates, styrenesulfonates, phosphates, etc., can also be used. Examples of such dispersants include, but are not limited to, Carbosperse® K-775 and Carbosperse® K-776 (co-polymers of acrylic and sulfonic acid), Carbosperse® K-797, Carbosperse® K-798, or Carbosperse® K-781 (co-polymers of acrylic, sulfonic acid and styrenesulfonic acid), all available from Lubrizol Corporation. Additionally, low molecular weight co-polymers of carboxylic acid monomers with some hydrophobic monomers can likewise be used. Dispersants from this group are suitable here if their acid number (content of hydrophilic acidic moieties in polymer chain) is high enough to make the dispersant well soluble in aqueous phase. Examples of such dispersants include, but are not limited to styrene-acrylic acid copolymers such as Joncryl® 671, Joncryl® 683, Joncryl® 296, or Joncryl® 690, available from BASF, as well as other water soluble styrene-maleic anhydride co-polymer resins.

Referring now to the non-ionic dispersants that can be used, examples include water-hydrolysable silane coupling agents (SCAs) with relatively short (oligomer length range of not longer than 50 units, not longer than 30 units, or not longer than 15 units, e.g., 10 to 15 units) polyether chain(s), which are also soluble in water. An example of such a dispersant includes Silquest® A1230 polyethylene glycol methoxysilane available from Momentive Performance Materials. Other examples include soluble low-to-midrange M (e.g., usually molecular mass of the polymer less than 15,000 Da) branched co-polymers of comb-type structures with polyether pendant chains and acidic anchor groups attached to the backbone, such as Disperbyk® 190 and Disperbyk® 199 available from BYK Chemie, as well as Dispersogen® PCE available from Clariant. In one example, one or both of Cab-O-Sperse® K-7028 and Disperbyk® 190 can be used.

In one example, reactive hydrophilic alkoxysilane dispersants that can be present, and examples include, but are not limited to, hydrolysable alkoxysilanes with alkoxy group attached to water-soluble (hydrophilic) moieties, such as water-soluble polyether oligomer chains, phosphate groups, or carboxylic groups. In some examples, the dispersant used to disperse white metal oxide pigment can be a polyether alkoxysilane or polyether phosphate dispersant. Upon dissolution in water with the white metal oxide pigment, the alkoxysilane group of the dispersant often hydrolysis resulting in formation of silanol group. The silanol group, in turn, may react or form hydrogen bonds with hydroxyl groups of metal oxide particulate surface, as well as with silanol groups of other dispersant molecules through hydrogen bonding. These reactions lead to bonding or preferential absorption of the dispersant molecules to the metal oxide particulate surfaces and also form bonds between dispersant molecules themselves. As a result, these interactions can form thick hydrophilic coatings of reactive dispersant molecules on surface of the white metal oxide pigment. This coating can increase the hydrodynamic radius of the particulates and thus reduce their effective density and settling rate. Furthermore, the dispersant coating prevents agglomeration of the white metal oxide pigment upon settling so that when sediment and settling does occur over time in the ink formulations, the settled white metal oxide pigment remain fluffy and thus are easy to re-disperse upon agitation. In still further detail, these dispersants have a relatively short chain length and do not contribute significantly to the ink viscosity, even with relatively high metal oxide particulate loads, e.g. over 25 wt % white metal oxide pigment in the ink.

As mentioned, a suitable alkoxysilane dispersant can have an alkoxysilane group which can be easily hydrolyzed in aqueous environment and produce a silanol group, and a hydrophilic segment. The general structure of the alkoxysilane group is $-Si(OR)_3$, where R most can be methyl, ethyl, n-propyl, isopropyl, or even a longer (branched or unbranched) alkane chain. It is noted that the longer the hydrocarbon (R), the slower hydrolysis rate and rate of interaction with dispersed metal oxide particulate surface. In a few highly practical examples, structures with $-Si(OR)_3$ where R is methyl or ethyl can typically be used. The hydrophilic segment of the alkoxysilane dispersant can likewise be large enough (relative to the whole molecule size) in order to enable dispersant solubility in aqueous environment, as well as prevent agglomeration of the white metal oxide pigment. In one example, the hydrophilic segment can be a polyether chain, e.g., polyethylene glycol (PEG) or its co-polymer with polypropylene glycol (PPG). Polyether-based dispersant moieties have clean thermal decomposition, and thus, are good candidates for use. When heated above decomposition temperature, PEG and PPG-based molecules decompose into smaller molecular fragments with high volatility or good water solubility. Thus, their decomposition usually does not form noticeable amounts of solid residue on surface of microscopic heaters used for driving thermal inkjet printheads (which can cause thermal inkjet printheads to fail over time or render them non-operational in some instances).

In further detail, examples polyether alkoxysilane dispersants that may be used to disperse white metal oxide pigment can be represented by the following general Formula (I):

wherein:

a) $R^1$, $R^2$ and $R^3$ are hydroxy groups, or hydrolyzable linear or branched alkoxy groups. For hydrolyzable alkoxy groups, such groups can have 1 to 3 carbon atoms; in one aspect, such groups can be —$OCH_3$ and —$OCH_2CH_3$. In some examples, $R^1$, $R^2$ and $R^3$ are linear alkoxy groups having from 1 to 5 carbon atoms. In some other examples, $R^1$, $R^2$ and $R^3$ groups are —$OCH_3$ or —$OC_2H_5$.

b) PE is a polyether oligomer chain segment of the structural formula $[(CH_2)_n—CH(R)—O]_m$, attached to Si through Si—C bond, wherein n is an integer ranging from 0 to 3, wherein m is an integer superior or equal to 2 and wherein R is H or a chain alkyl group. R can also be a chain alkyl group having 1 to 3 carbon atoms, such as $CH_3$ or $C_2H_5$. In some examples, m is an integer ranging from 3 to 30 and, in some other examples, m is an integer ranging from 5 to 15. The polyether chain segment (PE) may include repeating units of polyethylene glycol (PEG) chain segment (—$CH_2CH_2$—O—), or polypropylene glycol (PPG) chain segment (—$CH_2$—CH($CH_3$)—O—), or a mixture of both types. In some examples, the polyether chain segment (PE) contains PEG units (—$CH_2CH_2$—O—); and c) $R^4$ is hydrogen, or a linear or a branched alkyl group. In some examples, $R^4$ is an alkyl group having from 1 to 5 carbon atoms.

Other examples of dispersants used to disperse white metal oxide pigment can include polyether alkoxysilane dispersants having the following general Formula (II):

wherein R', R" and R"' are linear or branched alkyl groups. In some examples, R', R" and R"' are linear alkyl groups having from 1 to 3 carbon atoms in chain length. In some examples, R', R" and R"'—$CH_3$ or —$C_2H_5$. $R^4$ and PE are as described above for Formula (I); i.e. PE is a polyether oligomer chain segment of the structural formula: $[(CH_2)_n—CH—R—O]_m$, wherein n is an integer ranging from 0 to 3, wherein m is an integer superior or equal to 2 and wherein R is H or a chain alkyl group; and $R^4$ is hydrogen, or a linear or a branched alkyl group. In some examples, $R^4$ is $CH_3$ or $C_2H_5$.

In some examples, the white metal oxide pigment present in the ink compositions are dispersed with polyether alkoxysilanes. Examples of suitable polyether alkoxysilanes include $(CH_3O)_3Si$—$(CH_2CH_2O)_{n'}$, H; $(CH_3CH_2O)_3Si$—$(CH_2CH_2O)_{n'}$, H; $(CH_3O)_3Si$—$(CH_2CH_2O)_{n'}$, $CH_3$; $(CH_3CH_2O)_3Si$—$(CH_2CH_2O)_{n'}$, $CH_3$; $(CH_3O)_3Si$—$(CH_2CH_2O)_{n'}$, $CH_2CH_3$; $(CH_3CH_2O)_3Si$—$(CH_2CH_2O)_{n'}$, $CH_2CH_3$; $(CH_3O)_3Si$—$(CH_2CH(CH_3)O)_{n'}$, H; $(CH_3CH_2O)_3Si$—$(CH_2CH(CH_3)O)_{n'}$, H; $(CH_3O)_3Si$—$(CH_2CH(CH_3)O)_{n'}$, $CH_3$; $(CH_3CH_2O)_3Si$—$(CH_2CH(CH_3)O)_{n'}$, $CH_3$; wherein n' is an integer equal to 2 or greater. In some examples, n' is an integer ranging from 2 to 30 and, in some other examples, n' is an integer ranging from 5 to 15.

Commercial examples of the polyether alkoxysilane dispersants include, but are not limited to, the aforementioned Silquest®A-1230 manufactured by Momentive Performance Materials, and Dynasylan® 4144 manufactured by Evonik/Degussa.

The amount of dispersant used to disperse the white metal oxide pigment and other solids may vary from about 0.3% by weight to about 300% by weight of the white metal oxide pigment content. In some examples, the dispersant content range is from about 0.5 to about 150% by weight of the white metal oxide pigment content. In some other examples, the dispersant content range is from about 5 to about 100% by weight of the white metal oxide pigment content.

A dispersion of white metal oxide pigment suitable for forming the white inks of the present disclosure can be prepared via milling or dispersing metal oxide powder in water in the presence of suitable dispersants. For example, the metal oxide dispersion may be prepared by milling commercially available inorganic oxide pigment having large particulate size (in the micron range) in the presence of the dispersants described above until the desired particulate size is achieved. The starting dispersion to be milled can be an aqueous dispersion with solid content up to 65% by weight of the white metal oxide pigment or pigments. The milling equipment that can be used may be a bead mill, which is a wet grinding machine capable of using very fine beads having diameters of less than 1.0 mm (and, generally, less than 0.5 mm) as the grinding medium, for example, Ultra-Apex Bead Mills from Kotobuki Industries Co. Ltd. The milling duration, rotor speed, and/or temperature may be adjusted to achieve the dispersion particulate size desired. In one example, the polymeric dispersant can include a short-chain anionic dispersant or a non-ionic or predominantly non-ionic dispersant, or both. Thus, the polymeric dispersant can be co-milled with the white metal oxide pigment, thereby modifying both particles of the white metal oxide pigment and the surface thereof with the polymeric dispersant.

In further detail regarding the fumed oxide particulates that can be co-dispersed in the inks, the structures can be any of a variety of fumed oxide particles, such as fumed semi-metal oxide particulates or fumed metal oxide particulates. Because these low refractive index particles are used to provide pigment spacing, the size range for these particles can be comparable to the size range for the white metal oxide pigment particles, e.g., from 20 nm to 750 nm, from 30 nm to 500 nm, or often from 100 nm to 300 nm.

Figure 5:
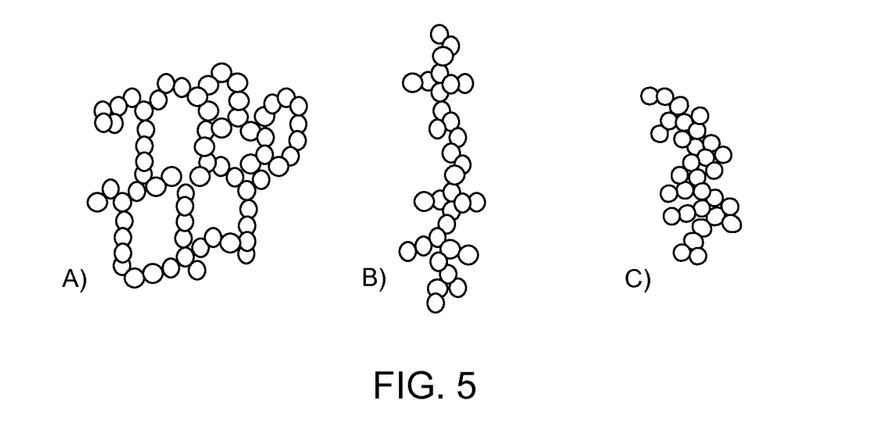
FIG. 5 depicts different typical structures of fumed oxide particulates that can be used in accordance with examples of the present disclosure.

Fumed oxides (metals or semi-metals) have the appearance of fluffy powders with particles of complex structure. FIG. 5 depicts three specific representations of what fumed oxides may look like under a TEM imaging device. Their primary particles are typically from 1 nm to 100 nm, and more typically from 5 nm to 40 nm in size, and their aggregated (or fused) size includes short chains which form tertiary agglomerates, e.g., about 30 nm to about 500 nm in size, acting as individual particles in the dispersion. Due to such highly developed internal structures, these particles are quite porous and can, in accordance with examples of the present disclosure, act as low refractive index spacers between white metal oxide pigment particles. In FIG. 5, stationary particles A, chain-like particles B, and closely packed particles C are shown. These are merely representative of fumed oxide particulate structures, but what they have in common is their low density and low refractive index. Thus, when incorporated into printed white image or layer, the fumed oxide particles act to reduce the chance of white pigment particles collapsing onto each other when an ink layer is dried and/or cured, thus improving opacity of the dried image or coating.

Suitable fumed oxide particulates include, but are not limited to, fumed silica, fumed alumina, fumed zirconia, fumed cerium oxide ($Ce_2O_3$), and the like. A typical content of fumed oxide particulates in a white ink formulation can be from 0.1 wt % to 15 wt %, for example, and more typically from 0.2 wt % to 5 wt %, or from 0.3 wt % to 4 wt %. Commercially available examples of fumed oxide particulates available in dispersion form include fumed silica dispersions Cab-O-Sperse® 1020K, Cab-O-Sperse® 1030K and Cab-O-Sperse® 1015A made by Cabot Corporation, as well as AERODISP® W 7520, AERODISP® W 7622 and AERODISP® W 7520 available from Evonik Industries. In some examples, the fumed silicas can include anionically-stabilized colloidal silica dispersions, such as Cab-O-Sperse® silica series available from Cabot Corporation.

It is also notable that there can be some advantages to adding the latex particulates to the inks of the present disclosure. For example, by combining white metal oxide pigment with both the fumed oxide particulates and latex particulates, opacity can be increased further. In one aspect, a white metal oxide pigment to latex particulate weight ratio can be from 6:1 to 1:3. In certain specific examples, by selecting white metal oxide pigment with a high refractive index (e.g. from 1.8 to 2.8), and latex particulates with a relatively lower refractive index (e.g., from 1.3 to 1.6), the opacity of the ink when printed on a media sheet can be unexpectedly increased further compared to an ink without the added latex particulates.

Furthermore, the latex particles (at high enough concentration) can form continuous polymer phase after the ink printing and drying/curing. This polymer phase can bind rigid particles (both white metal oxide pigment and fumed oxide particulates) into continuous coating with good mechanical durability, i.e. act as a binder phase. In the absence of the binder in these ink formulations, the printed layer would may not have as much mechanical durability (reduced rub resistance, etc.). In one example, a latex dispersion may be produced by emulsion polymerization or co-polymerization of acrylic and styrene monomers. The list of suitable monomers can include (but is not limited to) C1 to C8 alkyl methacrylates and alkyl acrylates, styrene and substituted methyl styrenes, polyol acrylates and methacrylates such as hydroxyethyl acrylate, acrylic acid, methacrylic acid, polymerizable surfactants, or the like.

The monomers used in the latexes can also be vinyl monomers. In one example, the monomers can be one or more of vinyl monomers (such as vinyl chloride, vinylidene chloride, etc.), vinyl ester monomers, acrylate monomers, methacrylate monomers, styrene monomers, ethylene, maleate esters, fumarate esters, itaconate esters, or mixtures thereof. In one aspect, the monomers can include acrylates, methacrylates, styrenes, or mixtures thereof. The monomers can likewise include hydrophilic monomers including acid monomers as mentioned, as well as hydrophobic monomers. Furthermore, monomers that can be polymerized in forming the latexes include, without limitation (some of which being previously mentioned), styrene, α-methyl styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, 2-ethylhexyl acrylate, 2-ethylhexyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, isobornyl methacrylate, cyclohexyl methacrylate, trimethyl cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, isobornyl acrylate, dimethyl maleate, dioctyl maleate, acetoacetoxyethyl methacrylate, diacetone acrylamide, N-vinyl imidazole, N-vinylcarbazole, N-Vinyl-caprolactam, combinations thereof, derivatives thereof, or mixtures thereof.

Acidic monomers that can be polymerized in forming latexes include, without limitation, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, or mixtures thereof.

In one specific example, the acidic monomer content in the latex mix can range from 0.1 wt % to 15 wt % and the balance being non-acidic monomers, with suitable latex particle sizes range from 50 nm to 300 nm. Glass transition temperatures may range from −20° C. to 130° C. The latex content in the white ink formulations, when present, may range from 2 wt % to 30 wt %, or from 3 wt % to 20 wt %, or more typically from 5 wt % to 15 wt %.

As mentioned, the particulate size of the white metal oxide pigment can be from 100 nm to 1,000 nm, but in other examples, the particulate size can be from 125 nm to 700 nm, or from 150 nm to 500 nm. These larger sized particulates are considered to be efficient particulate sizes for light scattering when spaced appropriately by the fumed oxide particulates and in some cases, the latex particulates. The more efficient the light scattering, typically, the more opaque the printed ink layer may be (assuming appropriate spacing in the pigmented layer as described herein). Thus, the white inks of the present disclosure can be formulated such that when printed, the fumed oxide particulates provide an average space between white metal oxide pigment ranging from 20 nm to 1,000 nm, in one example. In other examples, the average space between white metal oxide pigment can be 50 nm to 500 nm, from 50 to 300, or in one specific example, about 50 nm to 250 nm.

In further detail, optical spacing can be experimentally evaluated by printing the ink on a media substrate, and when a latex is present, fusing the ink by applying heat at a temperature about 2° C. to 110° C. above the minimum film formation temperature of the latex particulates, and evaluating using Transition Electron Microscopy (TEM) cross-section photo of a printed white ink layer after drying. If the opacity provided by the white ink is not high enough, the ratio of white metal oxide pigment to fumed oxide particulates (or latex particulates) can be adjusted up or down, as effective, or the thickness of the ink can be increased. That being stated, an advantage of the white inks of the present disclosure is that in some instances, thickness does not need to be increased to increase opacity. For example, by appropriately spacing the white metal oxide pigment with the fumed oxide particulates, opacity can be boosted from 0.1% to 25%, and more typically, from 5% to 25%.

In addition to assisting with enhanced opacity, as briefly mentioned, the latex particulates can also provide enhanced durability. More specifically, the use of latex particulates, including fusible latex particulates that are thermally or otherwise cured after printing on the media substrate, can provide added durability to the printed image. Thus, the latex can provide the dual role of assisting the fumed oxide particulates in enhancing opacity by appropriately spacing the white metal oxide pigment, and can also provide durability on the printed media sheet. This is particularly the case in examples where there may be high metal oxide particulate loads that are dispersed by appropriate dispersing agents. Films formed by hard ceramic particulates such as high refractive index metal oxides on surface of low porosity and non-porous media substrates tend to have very poor mechanical properties. The film-forming behavior of latex particulates described herein can bind the relatively large white metal oxide pigment (with dispersing agent present in the ink) into continuous coating that can be very durable. Additionally, as mentioned, the low refractive index of the polymer film along with the fumed oxide particulates creates low refractive index or "n" domains, i.e. optical spacers between high n white metal oxide pigment particles, thereby enhancing opacity of the print.

Coalescence of latex particulates into continuous phase creates low refractive index domains in the coating. The refractive index of the fused latex in the coating may range from 1.3 to 1.6, and in one example, can be from 1.4 to 1.6, or 1.4 to 1.5. That, in conjunction with the fumed oxide particulates with a refractive index ranging from 1.1 to 1.6, is contrasted with the white metal oxide pigment particles which have a refractive index ranging from 1.8 to 2.8, or from 2.2 to 2.8. Specific examples include zinc oxide (about 2.4), titanium dioxide (about 2.5 to 2.7), zirconium oxide (about 2.4), etc. Typically, the difference in the refractive indexes can be from about 0.2 to 1.5, or more, if possible (typically, the higher is the better), though this is not always the case, as long as there is enough of a difference that the opacity can be increased at least to some degree by the optical spacing and the refractive index difference.

The latexes can have various shapes, sizes, and molecular weights. In one example, polymer in the latex particulates may have a weight average molecular weight (Mw) of about 5,000 Mw to about 500,000 Mw. In one aspect, the latex particulates can have a weight average molecular weight (Mw) ranging from about 100,000 Mw to about 500,000 Mw. In some other examples, the latex resin has a weight average molecular weight of about 150,000 Mw to 300,000 Mw.

The white inks described herein are very useful for inkjet application, including thermal inkjet application. In one example, a reactive hydrophilic alkoxysilane dispersant can be used to assist in particulate dispersion and jettability. These or other dispersants can be short-chain anionic, or non-ionic or predominantly non-ionic in nature. In some specific examples, inkjet printing of white coatings or patterns with adequate opacity (>50-60%) can benefit from a relatively high pigment load (e.g. white metal oxide pigment above 2 wt %, above 5 wt %, above 8 wt %, etc.). Jetting of high pigment load (particularly with other solids) inks becomes challenging even for piezo printheads. However, with the use of an appropriate dispersant, such as the non-ionic or predominantly non-ionic dispersants described herein, more reliable performance of higher metal oxide particulate loads printed from thermal inkjet printheads with low nominal drop weight (as low as 10 ng, or even as low as 5 ng) can be realized.

Turning now to the fixer fluid that may be used with the white inks of the present disclosure, cationic polymer can be added to various ink or liquid vehicles to form fixer fluids of various viscosities for various application processes. Cationic polymers that may be used can include guanidinium or fully quaternized ammonium functionalities, such as quaternized polyamine copolymers. In one example, the cationic polymer might not contain primary or secondary ammonium functionalities, such as polyallylamine or polyethylene imine. Generally, for some digital application processes, i.e. thermal inkjet application, the weight average molecular weight (Mw) of the cationic polymer allows viscosity of 1 cP to 25 cP at 25° C., 1 cP to 15 cP at 25° C., or 1 cP to 10 cP at 25° C., as measured on a Brookfield viscometer. Though viscosity outside of this range can be used, particularly for piezo inkjet applications or for analog (non-digital printing) applications, e.g., 1 cP to 35 cP at 25° C. (for piezo inkjet) and 1 cP to 500 cP at 25° C. for analog applications. Typical weight average molecular weight for the cationic polymer can be less than 500,000 Mw, and in one aspect, less than 50,000 Mw. In another example, cationic polymers can have high charge densities to improve fixing efficiencies. As such, cationic charge densities can be higher than 1000 microequivalents per gram cationic functionality. In one aspect, higher than 4000 microequivalents per gram can be used. Additionally, concentrations can be low to avoid regulatory issues with aquatic toxicity, e.g., from 0.1 wt % to 25 wt %, and in one aspect, 1 wt % to 5 wt %, or in another aspect, from 1 wt % to 2.5 wt %.

In additional detail, classes of cationic polymers that can be used include, but are not limited to, quaternized polyamines, dicyandiamide polycations, diallyldimethyl ammonium chloride copolymers, quaternized dimethylaminoethyl(meth)acrylate polymers, quaternized vinylimidizol polymers, alkyl guanidine polymers, alkoxylated polyethylene imines, and mixtures thereof. It is to be understood that one or more polycations may be used, and that any desirable combination of the polycations can be used. One or more ions of the cationic polyelectrolytes may be ion-exchanged for a nitrate, acetate, mesylate, or other ion. As a non-limiting example, one material is Floquat® FL2350, a quaternized polyamine derived from epichlorohydrin and dimethyl amine, commercially available from SNF Inc.

Typical ink vehicle or fixer vehicle formulations described herein can include water and other ingredients, depending on the application method desired for use. For example, when jetting the ink or fixer, the formulation may include water as well as co-solvents present in total at from 0.1 wt % to 50 wt %, though amounts outside of this range can also be used. Further, surfactants can be present, ranging from 0.01 wt % to 10 wt %. The balance of the formulation can further include or other vehicle components known in the art, such as biocides, viscosity modifiers, materials for pH adjustment, sequestering agents, preservatives, and the like. Typically, the ink vehicle can include water as one of a major solvent and can be referred to as an aqueous liquid vehicle. It is noted that the fixer fluid may be formulated for inkjet application or for analog coating processes, and thus, the ingredients and concentrations for such different applications can vary widely. For example, a thicker slurry may be used for analog application, or a less viscous fluid may be used for digital application.

Both types of oxide particles, i.e. white metal oxide pigment and fumed oxide particulates, and when present, the latex binder, can be dispersed in water-based vehicle phase. Apart from water, the ink vehicle can include high boiling solvents and/or humectants such as aliphatic alcohols, aromatic alcohols, diols, glycol ethers, polyglycol ethers, 2-pyrrolidinones, caprolactams, formamides, acetamides, and long chain alcohols. Examples of such compounds include but are not limited to 2-pyrrolidinone and 2-methyl-1,3-propanediol. The concentration range for high boiling solvents and/or humectants in the ink can be from 0.1 wt % to 30 wt %, depending on the printhead jetting architecture, though amounts outside of this range can also be used.

Classes of co-solvents that can be used can include organic co-solvents including aliphatic alcohols, aromatic alcohols, diols, glycol ethers, polyglycol ethers, 2-pyrrolidinones, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like.

Consistent with the formulation of this disclosure, various other additives may be employed to enhance the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0.01 wt % to 2 wt %, for example, can be used. Viscosity modifiers and buffers may also be present, as well as other additives known to those skilled in the art to modify properties of the ink as desired. Such additives can be present at from 0.01 wt % to 20 wt %.

It is noted that when discussing the present inks and/or methods, each of these discussions can be considered applicable to each of these embodiments, whether or not they are explicitly discussed in the context of that embodiment. Thus, for example, in discussing refractive index related to a composition or the opacity in the context of the white ink, such elements are also relevant to and directly supported in the context of the methods described herein, and vice versa.

It is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context clearly dictates otherwise.

The term "white metal oxide pigment" refers to pigments that impart a white color to a ink, but may in fact be essentially colorless pigments with a high refractive index, e.g., greater than 1.6 or greater than 1.8. For Example, titanium dioxide ($TiO_2$) is an example of such a pigment that imparts white color to an ink, but when viewed on a particle by particle basis, can appear colorless.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Furthermore, it is understood that any reference to open ended transition phrases such "comprising" or "including" directly supports the use of other know, less open ended, transition phrases such as "consisting of" or "consisting essentially of" and vice versa.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. Additionally, a numerical range with a lower end of "0" can include a sub-range using "0.1" as the lower end point.

EXAMPLES

The following illustrates some examples of the disclosed inks, printed articles, and methods that are presently known. However, it is to be understood that the following are only exemplary or illustrative of the application of the principles of the present disclosure. Numerous modifications and alternative examples may be devised by those skilled in the art without departing from the spirit and scope of the present compositions and methods. Thus, while the present inks, fluid sets, and methods have been described above with particularity, the following examples provide further detail in connection with what are presently deemed to be the acceptable embodiments.

Example 1—Opacity Reduction as a Result of White Pigment Crowding Effect

A white ink formulation was prepared based on relatively large white metal oxide particles (i.e. 200 nm to 400 nm) of $TiO_2$ at 15 wt % based on the total weight of the ink. The ink was devoid of the fumed metal oxide particulates of the present disclosure, but did include a latex at 9 wt %. The white ink also included a balance of high concentration of liquid components including water and low volatility solvents. The ink was then wet printed at about 52 gsm (g/m²) to generate two samples. A first sample was frozen in liquid nitrogen and the L* measurement taken to provide an opacity measurement without drying. A second sample was dried and cured at 100° C.

Figure 6:
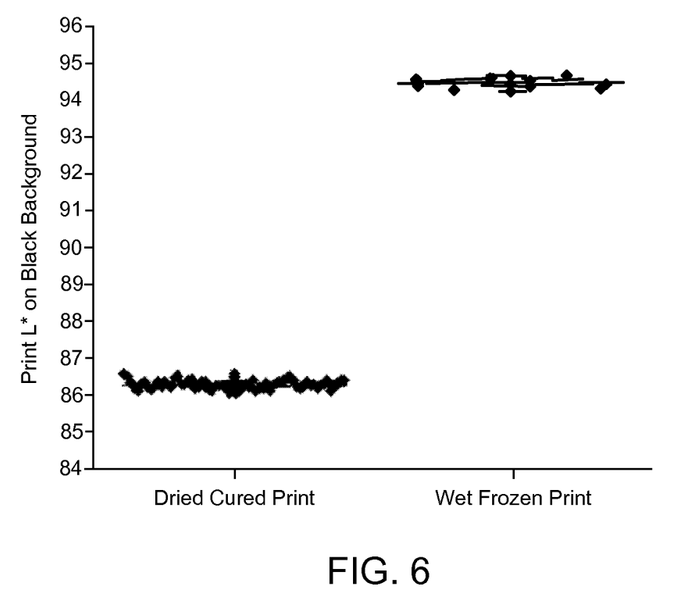
FIG. 6 is a graph which illustrates opacity reduction as a result of a white pigment crowding effect in accordance with examples of the present disclosure.

Essentially, the ink was prepared to demonstrate the impact of pigment crowding as it relates to opacity. Upon printing and drying/curing, the printed coating fairly dramatically reduced in thickness, i.e. up to a few times the original thickness, as removal of the water and volatile solvents caused the white pigment particles to collapse upon one another. FIG. 6 compares the whiteness (L*) of the white ink when printed on a black vinyl substrate before (by freezing) and after drying/curing. As notable from FIG. 6, the L* value of the printed coating that is not allowed to be dried and cured is at about 94-95, and the L* value is fairly significantly reduced to about 86-87 when dried/cured.

Example 2—Preparation of White Metal Oxide Pigment Dispersion

An example white metal oxide pigment dispersion was prepared by milling $TiO_2$ pigment powder (Ti-Pure® R960, available from DuPont) in water-based slurry containing about 50 wt % of the white dry pigment admixed with two dispersants: (i) low molecular weight polyacrylic acid (Carbosperse® K-7028, available from Lubrizol Corporation) at 0.5 wt % per dry pigment weight, and (ii) a non-ionic branched polymer dispersant (Disperbyk® 190, available from BYK Chemie) at 0.8 wt % per dry pigment weight. The milling was carried out in a MiniCer® bead mill, available from NETZSCH Premier Technologies, LLC utilizing YTZ milling beads with a 0.3 mm diameter. The average particle size of the $TiO_2$ in the meld dispersion was about 220 nm (as determined by Nanotrack® particle size analyzer from Microtrack Corp.).

Example 3—Preparation of White Inks

Two white inks were prepared which were essentially identical, except that one ink included a fumed silica (Ink 2) and the other ink did not (Ink 1-Control Ink). The white metal oxide dispersion of Example 1 was prepared, and then other components were admixed therewith to form the white inks as shown in Table 1 below:

TABLE 1

| Components | Ink 1 (Control Ink) | Ink 2 |
|---|---|---|
| 2-Methyl-1,3-Propanediol | 9 wt % | 9 wt % |
| 2-Pyrrolidinone | 16 wt % | 16 wt % |
| [1]Tergitol ® 15-S-7 | 0.9 wt % | 0.9 wt % |
| [2]Capstone ® FS-35 | 0.5 wt % | 0.5 wt % |
| [1]Tergitol ® TMN-6 | 0.9 wt % | 0.9 wt % |
| Acrylic latex binder (41.5 wt % solids) | 21.75 wt % | 21.75 wt % |
| [3]Ti-Pure ® R960 TiO2 (52.4 wt %) dispersed with [4]Cab-O-Sperse ® K-7028 (0.5 wt %) and [5]Disperbyk ® 190 (0.8 wt %) from Example 1 | 28.6 wt % | 28.6 wt % |
| [4]Cab-O-Sperse 1020K fumed silica dispersion (20 wt % solids) | — | 9.8 wt % |
| Water | 22.35 wt % | 12.55 wt % |
| Total | 100 wt % | 100 wt % |

[1]Available from the Dow Chemical Company;
[2]Available from DuPont;
[3]Available from Momentive Performance Materials;
[4]Lubrizol Corporation;
[5]Available from BYK Chemie.

Example 4—Evaluation of White Inks with and without Fumed Oxide Particulates

Figure 7:
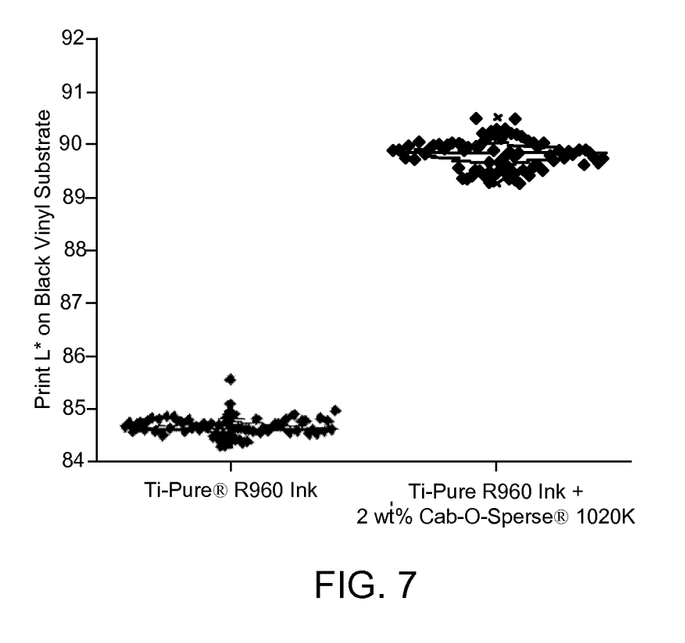
FIG. 7 is a graph illustrating opacity of white images printed using white inks with and without fumed oxide particulates in accordance with examples of the present disclosure.

In both Ink 1 (Control Ink) and Ink 2, the $TiO_2$ pigment content was about 15 wt % (per dry weight) plus 9 wt % of an acrylic latex binder. Both inks were printed from an HP OfficeJet® 8000 printer using an HP 792 printhead. The ink was deposited onto black vinyl media at an ink coverage density approximately 52 gsm. A cationic fixer containing 2.45 wt % of Floquat® FL2350 cationic polymer was jetted contemporaneously (as shown in FIG. 1) with the white inks using a separate printhead (HP 940). Ink 1 (Control Ink) and Ink 2 were both dried and cured about 100° C. L* values were measured for both white inks. Though some improvement for both inks may be generated by the presence of the latex particles, even more improvement can be seen by the inclusion of the fumed oxide particulates. Specifically, Ink 1 (Control Ink) registered an L* value of about 85, while the L* value of Ink 2 (including only about 2 wt % solids of fumed silica) was about 90, as shown in FIG. 7. Thus, the addition of a relatively small amount of fumed silica particles to the white ink formulation significantly improved print opacity.

While the disclosure has been described with reference to certain embodiments, those skilled in the art will appreciate that various modifications, changes, omissions, and substitutions can be made without departing from the spirit of the disclosure. It is intended, therefore, that the present disclosure be limited only by the scope of the following claims.

What is claimed is:

1. A white ink, comprising:
   an aqueous ink vehicle;
   from 5 wt % to 50 wt % of a white metal oxide pigment having an average particulate size from 75 nm to 2,000 nm and a refractive index ranging from 1.8 to 3.0;
   from 0.1 wt % to 15 wt % of fumed oxide particulates having a tertiary agglomerated average particulate size from 20 nm to 750 nm and a refractive index of 1.1 to 1.6; and
   a hydrophilic polymeric dispersant coating on a surface of the white metal oxide pigment.

2. The white ink of claim 1, wherein the white metal oxide pigment and fumed oxide particulates are present in the white ink at weight ratio from 2:1 to 50:1.

3. The white ink of claim 1, wherein the white metal oxide pigment includes titanium dioxide particulates, zinc oxide particulates, zirconium oxide particulates, or combinations thereof.

4. The white ink of claim 1, wherein the fumed oxide particulates include fumed semi-metal oxide particulates.

5. The white ink of claim 1, further comprising from 2 wt % to 30 wt % latex particulates having a glass transition temperature from −20° C. to 130° C., and wherein white metal oxide pigment and latex particulates are present in the white ink at a weight ratio from 6:1 to 1:3.

6. The white ink of claim 5, wherein the white metal oxide pigment has an average particle size from 170 nm to 400 nm, and the average optical spacing between white metal oxide pigment particles when the white ink is printed and fused is from 30 nm to 300 nm resulting in a fused image having a normalized opacity from 45% to 95%.

7. The white ink of claim 5, wherein the white ink printed on a non-porous substrate at ink coating density 30 gsm and heat fused at 10° C. above minimum film formation temperature of the latex particles has an opacity L* improvement of at least 5% greater than a comparative ink printed and heated under the same conditions, wherein the comparative ink is devoid of the fumed oxide particulates and replaced by ink vehicle.

8. The white ink of claim 1, wherein the polymeric dispersant includes a short-chain anionic dispersant having an acid number higher than 100 mg KOH/g based on dry polymer weight, or a non-ionic or predominantly non-ionic dispersant having an acid number not higher than 100 mg KOH/g based on dry polymer weight.

9. The white ink of claim 8, wherein the polymeric dispersant comprises both the short-chain anionic dispersant and the non-ionic or predominantly non-ionic dispersant, and wherein the polymeric dispersant is co-milled with the white metal oxide pigment, thereby modifying both particles of the white metal oxide pigment and the surface thereof with the polymeric dispersant.

10. The white ink of claim 1, wherein the white ink is a thermal inkjet ink.

11. A method of making the white ink of claim 1, comprising:
    milling the while metal oxide pigment in a water-based carrier with the hydrophilic polymeric dispersant to form a white metal oxide pigment dispersion; and
    admixing water, organic co-solvent, and the fumed oxide particulates with the white metal oxide pigment dispersion to form the white ink.

12. The method of claim 11, further comprising admixing latex particulates into the white ink, and wherein the white ink comprises:
    from 5 wt % to 50 wt % of the white metal oxide pigment having an average particulate size from 100 nm to 1,000 nm;
    from 0.1 wt % to 15 wt % of the fumed oxide particulates having a tertiary agglomerated average particulate size from 30 nm to 500 nm; and
    from 2 wt % to 30 wt % of the latex particulates having a glass transition temperature from 0° C. to 130° C.

13. A fluid set for inkjet imaging, comprising:
    the white ink of claim 1; and
    a fixer fluid, comprising:
        aqueous fixer vehicle, and
        from 0.1 wt % to 25 wt % cationic polymer.

14. The fluid set of claim 13, wherein the white ink is formulated for inkjet application, and wherein the fixer fluid is formulated for inkjet application having a viscosity from 1 cP to 35 cP at 25° C.

15. The fluid set of claim 13, wherein the white ink is formulated for inkjet application, and wherein the fixer fluid is formulated for analog application having a viscosity from 1 cP to 500 cP at 25° C.

16. The white ink of claim 1, wherein the white metal oxide pigment is present in an amount from 25 wt % to 50 wt %.

17. The method of claim 11, wherein the hydrophilic polymeric dispersant is a short-chain anionic dispersant, a non-ionic or predominantly non-ionic dispersant, or combination thereof.

18. The method of claim 11, wherein the white ink has a white metal oxide pigment to fumed oxide particulate weight ratio from 2:1 to 50:1.

19. The fluid set of claim 13, wherein the white metal oxide pigment has an average particulate size from 100 nm to 1,000 am.

20. The fluid set of claim 13, wherein the filmed oxide particulates have a tertiary agglomerated average particle size from 30 nm to 500 nm.

* * * * *